United States Patent
Baird

(10) Patent No.: US 7,797,383 B2
(45) Date of Patent: Sep. 14, 2010

(54) TECHNIQUES FOR MANAGING MULTI-WINDOW VIDEO CONFERENCE DISPLAYS

(75) Inventor: Randall Baird, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 771 days.

(21) Appl. No.: 11/472,946

(22) Filed: Jun. 21, 2006

(65) Prior Publication Data

US 2007/0299981 A1    Dec. 27, 2007

(51) Int. Cl.
*G06F 15/16*    (2006.01)
(52) U.S. Cl. ...................................................... 709/204
(58) Field of Classification Search ................ 709/205, 709/204

See application file for complete search history.

(56) References Cited

U.S. PATENT DOCUMENTS

| | | | |
|---|---|---|---|
| 5,448,315 A * | 9/1995 | Soohoo | 348/722 |
| 7,075,557 B2 * | 7/2006 | Ludtke et al. | 345/629 |
| 2003/0147010 A1 * | 8/2003 | Joung et al. | 348/565 |
| 2003/0210252 A1 * | 11/2003 | Ludtke et al. | 345/629 |
| 2005/0255912 A1 * | 11/2005 | Love et al. | 463/30 |
| 2006/0092269 A1 | 5/2006 | Baird et al. | |
| 2006/0248210 A1 * | 11/2006 | Kenoyer | 709/231 |

OTHER PUBLICATIONS

Codian MCU 4200 Series User Manual; Understanding How Participants Display in Layout Views; Version 1.3(1) Dec. 2005; pp. 30-37.
First Virtual Communications User Guide; First Virtual Conference Server 7.0; Mar. 2003; p. 67.

* cited by examiner

*Primary Examiner*—Aaron Strange
*Assistant Examiner*—Ebrahim Golabbakhsh
(74) *Attorney, Agent, or Firm*—Trellis IP Law Group, PC

(57) ABSTRACT

Techniques for dynamically mapping source video streams of sources to the requested destination video streams based on a policy are provided. The source video streams that are mapped to the destination video streams are changed based on events that cause changes in the mapping based on the policy. The mappings may be managed by a media switch remote from the end device or by an event aware stream router associated with the end device. The mappings are used to display images of participants associated with the source video streams where position changes in images displayed are minimized when events occur.

45 Claims, 10 Drawing Sheets

TECHNIQUES FOR MANAGING MULTI-WINDOW VIDEO CONFERENCE DISPLAYS

BACKGROUND OF THE INVENTION

Embodiments of the present invention generally relate to video conferencing and more specifically to managing a multi-window display based on a policy.

Video conferencing is a convenient and efficient way to hold meetings. Typically, participants in a meeting are displayed on a screen for another participant to view. When large meetings are taking place, it may not be desirable to show all the participants in the meeting on the screen at the same time. For example, a small minority of participants in the meeting may be doing most of the talking. Displaying all of the participants may be unnecessary and confusing to a participant since the display can be cluttered and participants' images may be too small. Additionally, the computational requirements of displaying all of the participants may be prohibitive. Thus, video conference systems may display only a small subset of participants in an arrangement of windows. For example, a certain number of the most recent speakers may be shown on the screen.

An end device may display multiple windows and assign a specific function or "policy" to each window. For example, one window can be associated with the most recent speaker, a second window associated with the second most recent speaker, etc. The displayed arrangement of participants may change dynamically depending on events that occur during the conference. For example, when a new speaker talks, the new speaker is now the most recent speaker. This causes all the speakers being displayed in the windows to change as the previous most recent speaker becomes the second most recent speaker, etc. This shuffling of windows causes confusion and is distracting to a participant.

DETAILED DESCRIPTION OF EMBODIMENTS OF THE INVENTION

Embodiments of the present invention provide techniques for displaying content from a plurality of sources n a video conference display in a plurality of display windows. When changes in the desirability of the source streams occur, a display method minimizes the number of windows that change their contents from associated source video streams.

The techniques comprise receiving a request for N destination video streams. One or more state changes in a conference that causes a change in a mapping of N source video streams to the N destination video streams is determined. The N most desirable source video streams from M available source video streams based on desirability of the M available source video streams is then determined. The desirability is determined based on a policy. The determined N source video streams are mapped to the N destination video streams, wherein the destination video streams are mapped to the plurality of display windows such that content from the N source video streams is rendered in the plurality of windows.

Figure 1A:
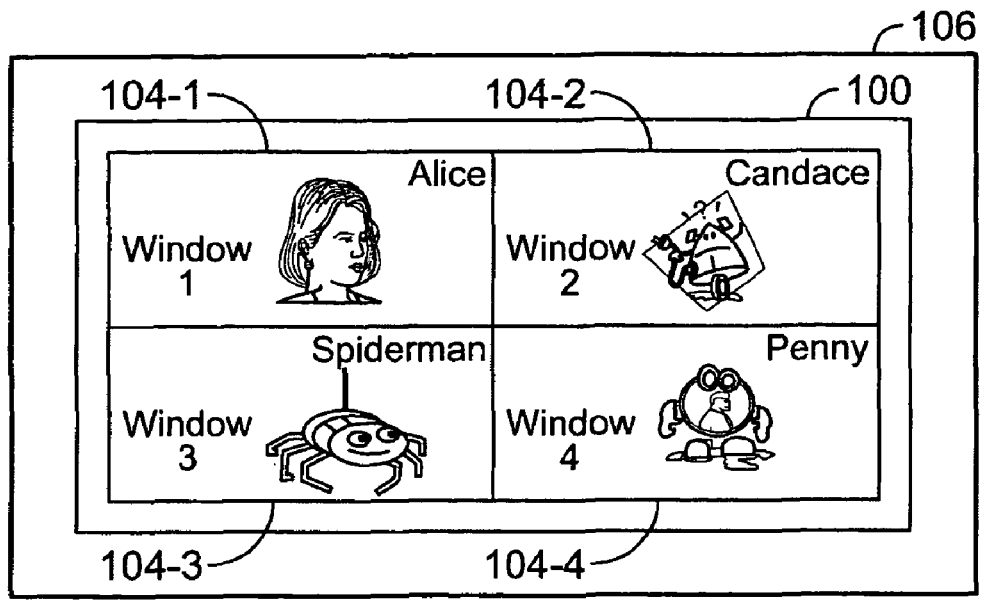
FIGS. 1A and 1B depict a display showing a plurality of windows for a video conference according to one embodiment of the present invention.

FIG. 1A depicts a display 100 showing a plurality of windows 104 for a video conference according to one embodiment of the present invention. A video conference may be any group of participants communicating with one another in a media environment that includes video of two or more participants. The communications may be made using rich media.

Display 100 may be part of an end device 106 that is used in a video conference. Although only one display 100 is shown, it will be understood that multiple displays 100 and end devices 106 may be used in a video conference.

End devices 106 are each associated with an end participant, client, customer, or other participant or viewer wishing to initiate a communication or participate in a video conferencing session in a communication system. End devices 106 may include devices used to initiate, join, or participate in a video conference, such as a computer, a personal digital assistant (PDA), a laptop or an electronic notebook, a telephone, a mobile station, an audio IP phone, a video phone appliance, a personal computer (PC) based video phone, a streaming client, or any other device, component, element, or object capable of voice, video, or data exchanges.

Each window 104 displays content from a source. Window 104 may be any area of display 100. For example, window 104 may be any shape and can be positioned anywhere on the display. Windows 104 may be created by using any techniques known in the art.

A source may be another end device 106 participating in the video conference. A video stream may be output by the source. Also, a source may be any other device that is associated with a participant and that is outputting a video stream.

As shown, content from four video streams is displayed in windows 104. In one embodiment, the content may be an image, such as an image of a participant, an icon, etc. Audio for the participant may also be outputted when a participant is speaking. Also, content may include video that is rendered, or any other information from a video stream.

End device 106 may request a plurality of destination video streams from which content is displayed in windows 104. A destination video stream is a stream that end device 106 can identify when it is received. A source video stream may be content that is being output by a source. The source video stream is mapped to a destination video stream and sent to end device 106. End device 106 then identifies the destination video stream as a stream that it requested and renders content from it.

In one embodiment, the destination video streams are requested based on a policy. The policy examines some property of the source streams, selects some number of source streams based on how desirable they are with respect to the property, then maps the source streams to destination streams. For example, the policy for each destination video stream may specify that its images be obtained from a source video stream associated with one of the N participants that most recently spoke (resulting, in the example, with the four most recent speakers being displayed in the four windows). Other policies that may be used include:

- the policy of selecting, in a round-robin fashion, the source video streams containing the video images associated with a specific set of participants,
- the policy of selecting the source video streams containing the N video images exhibiting the most motion,
- the policy of selecting the source video streams containing the N video images exhibiting the least motion,
- the policy of selecting the source video streams containing the N video images associated with a specific set of participants whose video motion exceeds some specified threshold,
- the policy of selecting the source video streams containing the video images associated with the N participants that have most recently controlled a shared application,
- the policy of selecting the source video streams containing the video images associated with the N participants geographically closest to the requesting end device,
- the policy of selecting the source video streams containing the video images associated with the N participants geographically closest to a specified location,
- the policy of selecting the source video streams containing the video streams associated with the N participants that have most recently experienced a specified external event.

Further details of policies are described in U.S. patent application Ser. No. 11/295,384, entitled "DYNAMICALLY SWITCHED AND STATIC MULTIPLE VIDEO STREAMS FOR A MULTIMEDIA CONFERENCE", filed Dec. 5, 2005, which is hereby incorporated by reference in its entirety for all purposes. Also, it will be understood that a person skilled in the art will appreciate other policies that may be used.

The properties examined by the above policies may be time-based or non-time based. For convenience, policies that examine time-based properties are called time-based policies, and policies that examine properties that are not time-based are called non-time-based policies. For example, the most recent speaker policy is a time-based policy.

In the time-based policies, the event that triggers recomputation by the policy indicates a change in the desirability of a single source video stream and makes that source video stream the most desirable of the source video streams. As a result, all streams that were previously more desirable than the source stream that just changed state have their desirability reduced by one increment. Therefore, it will be apparent to one skilled in the art that time-based policies can manage the source streams using a least-recent use (LRU) algorithm.

Other policies, such as the policy of selecting the streams that exhibit the most motion, are non-time-based policies. In the non-time-based policies, the selection of source video streams is determined by considering the desirability of all of the source video streams simultaneously. The simultaneous recomputation may force more than one source video stream to change its desirability in a single state change but is not necessary. Furthermore, the desirability of streams is dependent on some specific quantity, rather than on a simple LRU ordering of source streams.

A display method of displaying images in windows 106 is adhered to no matter which policy is used. When changes in the desirability of the source streams occur, a display method minimizes the number of windows that change their contents from associated source video streams.

The following example uses a least-recent use (LRU) display method of displaying images but it will be recognized that other policies may be used. In this case, the four most desirable source video streams are displayed in the four windows 106. As shown, a window 104-1 displays an image from Alice's source video stream, where Alice is the most recent speaker (having just spoken), window 104-2 displays an image from Candace's source video stream, where Candace is the second most recent speaker (having finished speaking just before Alice started speaking), window 104-3 displays an image from Spiderman's source video stream, where Spiderman is the third most recent speaker (having spoken before Candace), and window 104-4 displays an image from Penny's source video stream, where Penny is the fourth most recent speaker.

Penny is associated with a "least recently used" (LRU) window in the four-window display. Using the LRU display method, the window associated with Penny would be used to display the image of a new "active speaker" who starts speaking after Alice finishes. Note that if the new active speaker is already being displayed (i.e., is one of Candace, Spiderman or Penny) then the images displayed do not need to change, although their position for purposes of the LRU display method may change.

Figure 1B:
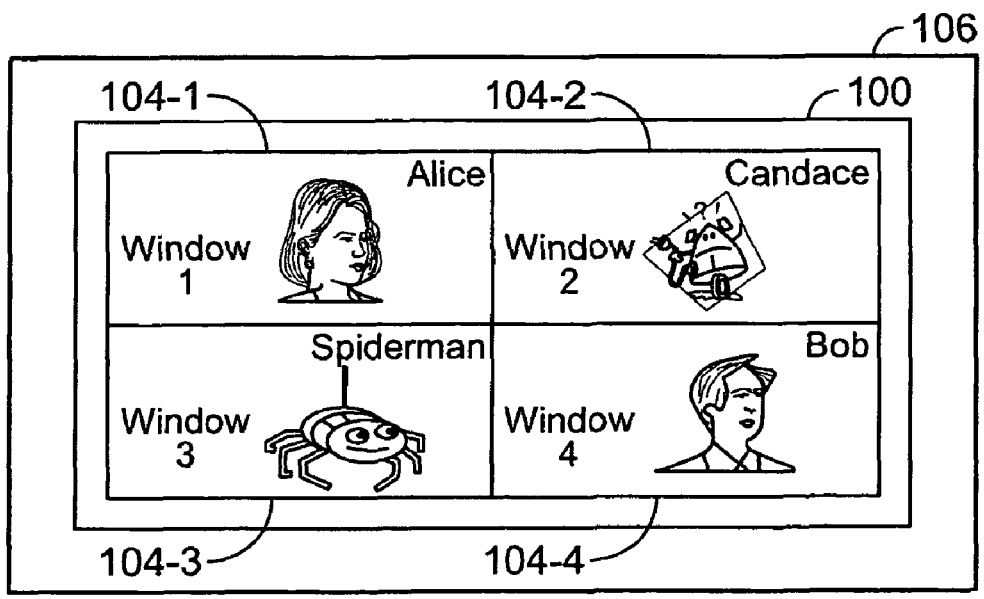

In one example, as shown in FIG. 1B, when a new speaker, Bob, speaks, Bob becomes the most recent speaker. Thus, in the above case, Bob becomes the most desirable source video stream. An order of most recent speakers is then shifted such that Alice is now the second most recent speaker, Candace is the third most recent speaker, and Spiderman is the fourth most recent speaker. Also, Penny is dropped out of the four most recent speakers, since her window was replaced by Bob. Thus, the desirability of the source video streams has been shifted.

In one embodiment, the LRU display method reduces the shifting of images displayed in windows 104. As shown in FIG. 1B, the least recent speaker, Penny, is replaced with the most recent speaker, Bob, in window 104-4. Thus, the content of only one window changes, that of window 104-4. Thus, the number of windows whose contents from associated source video streams 220 has changed, due to the changes in the desirability of the source streams, has been minimized. The minimization of window changes is less distracting than if the content of each window changed.

In one embodiment, a conferencing system not only maps source video streams to destination video streams based on a primary policy, it further changes the mapping so that the destination video streams reflect the display method. In this embodiment, end device 106 is relieved of the need to understand the underlying conference state change events and maintains a constant mapping of each destination stream 222 to a single window 104 in which it is rendered.

Figure 2:
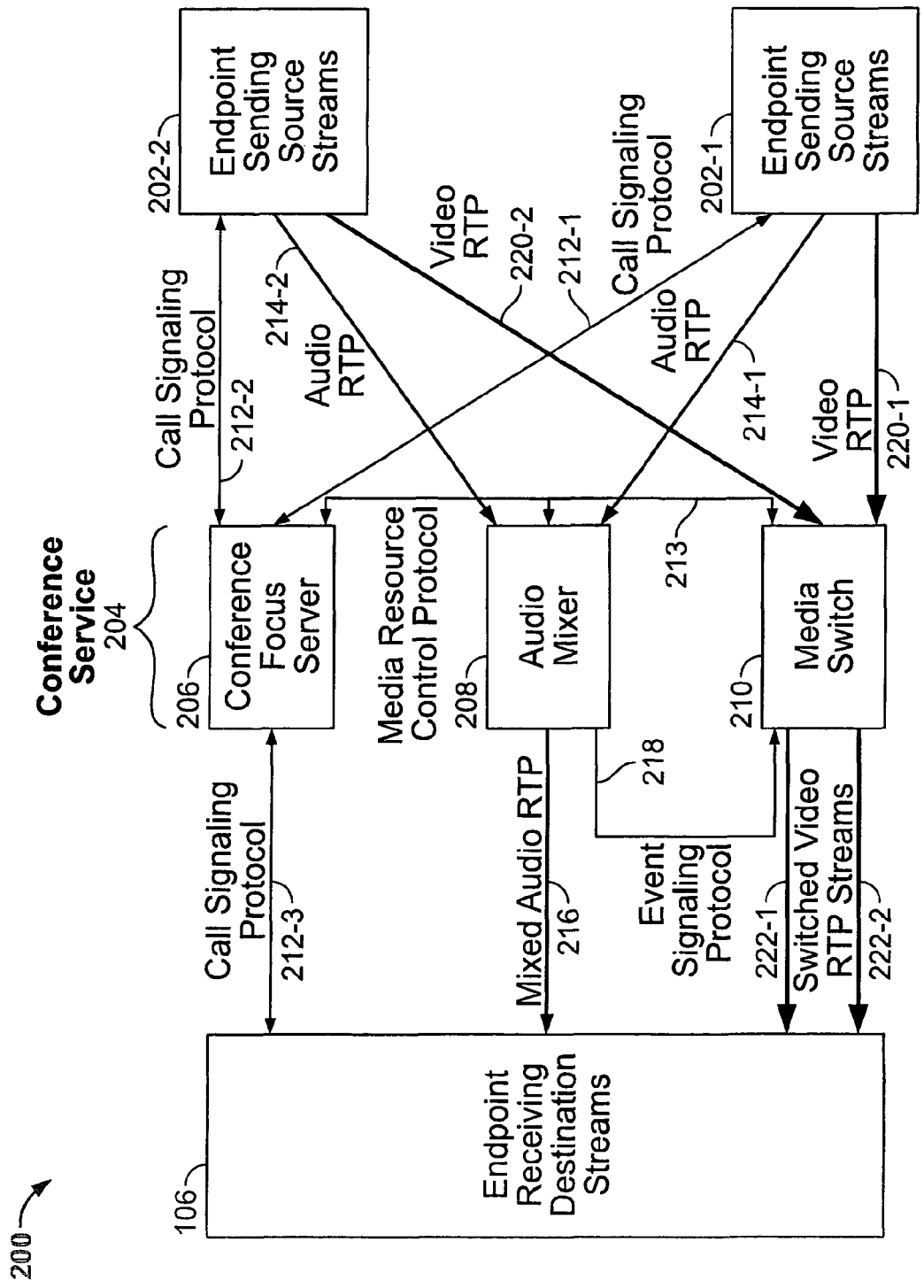
FIG. 2 depicts a system for implementing an embodiment of the present invention using a media switch to map N source video streams to N destinations video streams according to embodiments of the present invention.

FIG. 2 depicts a system 200 for implementing an embodiment of the present invention using a media switch 210 to map N source video streams to N destinations video streams according to embodiments of the present invention. System 200 may assume that the source-to-destination mapping is computed such that end device 106 need not to dynamically map the destination video streams to the individual windows 104.

System 200 includes source end devices 202, a conference service 204, and a destination end device 106. Conference service 204 provides a conference. A conference may be defined as a set of media streams, including video streams. The conference may include a subset of source video streams that are mapped to destination streams for various end devices 106 to display or render. Conference service 204 provides the set of video streams using media switch 210. Further details of examples of conference service 204 that may be used are described in U.S. patent application Ser. No. 10/680,918, entitled "SYSTEM AND METHOD FOR PERFORMING DISTRIBUTED VIDEO CONFERENCING", filed Oct. 8, 2003, and U.S. Pat. No. 6,989,856, entitled "SYSTEM AND METHOD FOR PERFORMING DISTRIBUTED VIDEO CONFERENCING", filed Nov. 6, 2003, both of which are incorporated by reference in their entirety for all purposes.

In an example, conference service 204 includes a focus server 206, an audio mixer 208, and a media switch 210. Conference focus server 206 is configured to handle call signaling 212 between destination end device 106 and source end devices 202. Conference focus server 206 supports signaling for, for example, skinny client control protocol (SCCP), H.323, and SIP end devices. A conference may be set up and maintained using audio mixer 208 and media switch 210 using a media resource control protocol 213 initiated by server 206.

Audio mixer 208 is configured to receive an incoming audio stream 214 from source devices and to mix them into a combined output. The mixed audio stream 216 is then sent to end device 106. Although end device 106 is shown as receiving audio and/or video, it will be recognized that end device 106 may also be a source end device 202, and vice versa. Also, mixer 208 can determine events that occur and send them to media switch 210 using event signaling protocol 218. For example, audio events that indicate which sources 106 are currently speaking are sent to media switch 210.

Media switch 210 is configured to receive source video streams 220 from sources 202. Source video streams 220 are mapped to the requested destination video streams 222. Destination video streams 222 are then rendered by end device 106 in display 100 to reduce the shifting of images. Other details of media switch 210 are described in U.S. patent application Ser. No. 10/680,918, entitled "SYSTEM AND METHOD FOR PERFORMING DISTRIBUTED VIDEO CONFERENCING", filed Oct. 8, 2003, and U.S. Pat. No. 6,989,856, entitled "SYSTEM AND METHOD FOR PERFORMING DISTRIBUTED VIDEO CONFERENCING", filed Nov. 6, 2003, both of which are incorporated by reference in their entirety for all purposes.

Figure 3:
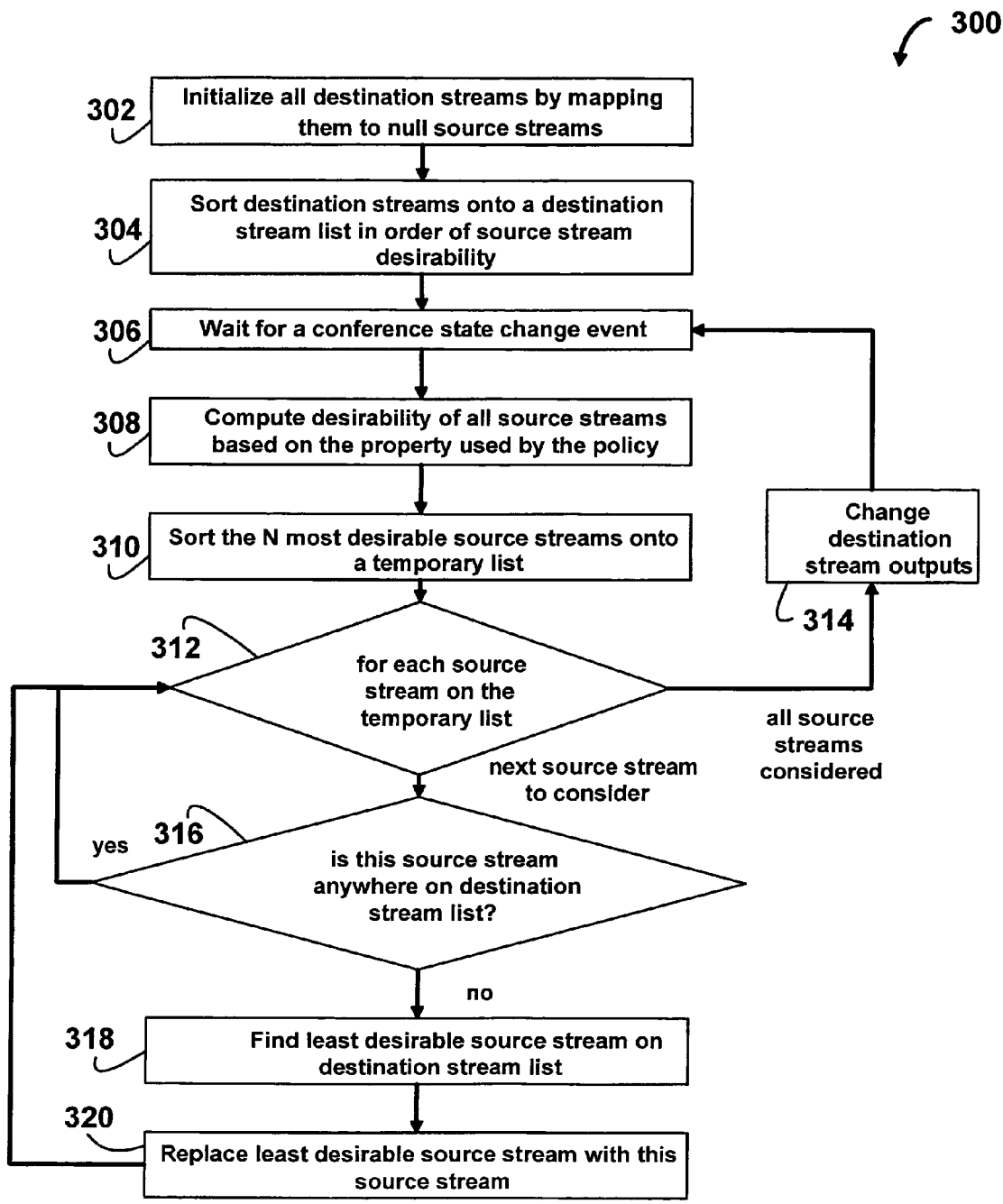
FIG. 3 depicts a simplified flow chart of a method using a policy to select the N source video streams and map them to the N destination streams according to one embodiment of the present invention.

FIG. 3 depicts a simplified flow chart 300 of a method using a policy to select the N source video streams and map them to the N destination streams 222 according to one embodiment of the present invention. The method may assume that the source-to-destination mapping is computed such that end device 106 may maintain a fixed mapping from the destination video streams 222 to the individual windows 104.

In step 302, the method initializes a set of destination streams 222 by mapping a null source video stream for every destination stream 222. In step 304, the initialized destination streams 222 are placed on a persistent list referred to as the destination streams list.

In step 306, the method then waits for a conference state change that requires a recomputation according to the policy. This state change may be represented, for example, as an event indicating that some property of the source video streams has changed, as a timer event, or as any other representation of a state change.

Once the state change has occurred, in step 308, the policy recomputes the desirability of all source video streams, based on the property specified in the policy. In one embodiment, the method omits any source stream 220 that is associated with the end device 106 that requests the destination streams 222. This prevents a participant from seeing him/herself in one of his own windows, which can be distracting. In step 310, the method sorts the N most desirable source video streams onto a temporary list in order of desirability, starting with the most desirable and proceeding to the least desirable.

Starting at step 312, each source video stream 220 on the temporary list is considered in order, and the new mapping of source to destination streams 222 begins. When all source video streams 220 have been considered, the mapping is complete and the method proceeds to step 314, where the content of the actual destination streams 222 is changed based on the new source-to-destination mapping, and the method returns to step 306 to wait for the next state change. In this case, content from a source video stream is sent for each associated destination stream.

If all the source video streams 220 have not been considered, in step 316, the current source video stream from the temporary list is considered. If this source video stream is already mapped to a destination stream 222 on the destination stream list, then this mapping is not changed and the method proceeds to consider the next source video stream back in step 312. By leaving the source-to-destination mapping alone for source video stream 220, it is ensured that existing sources being displayed on end device 106 remain in the same window, even when the desirability of many source video streams 220 may have changed simultaneously.

If the current source video stream 220 from the temporary list is not mapped to any destination stream 222 on the destination stream list, then, in step 318, the method determines the least desirable source video stream 220 on the destination stream list. In step 320, source video stream 220 determined is replaced by the source video stream currently under consideration. By replacing the least desirable source video stream 220 on the destination list with the most desirable source video stream 220 that needs to be added to the list, the method ensures that none of the source video streams 220 that have been inserted in the destination list for this conference state change are removed. Thus, source video streams 220 previously considered from the temporary list are not accidentally replaced.

Once the current source video stream has replaced the least desirable source video stream 220 on the destination list, the method returns to step 312 to consider any additional source video streams 220 on the temporary list.

Figure 4A:
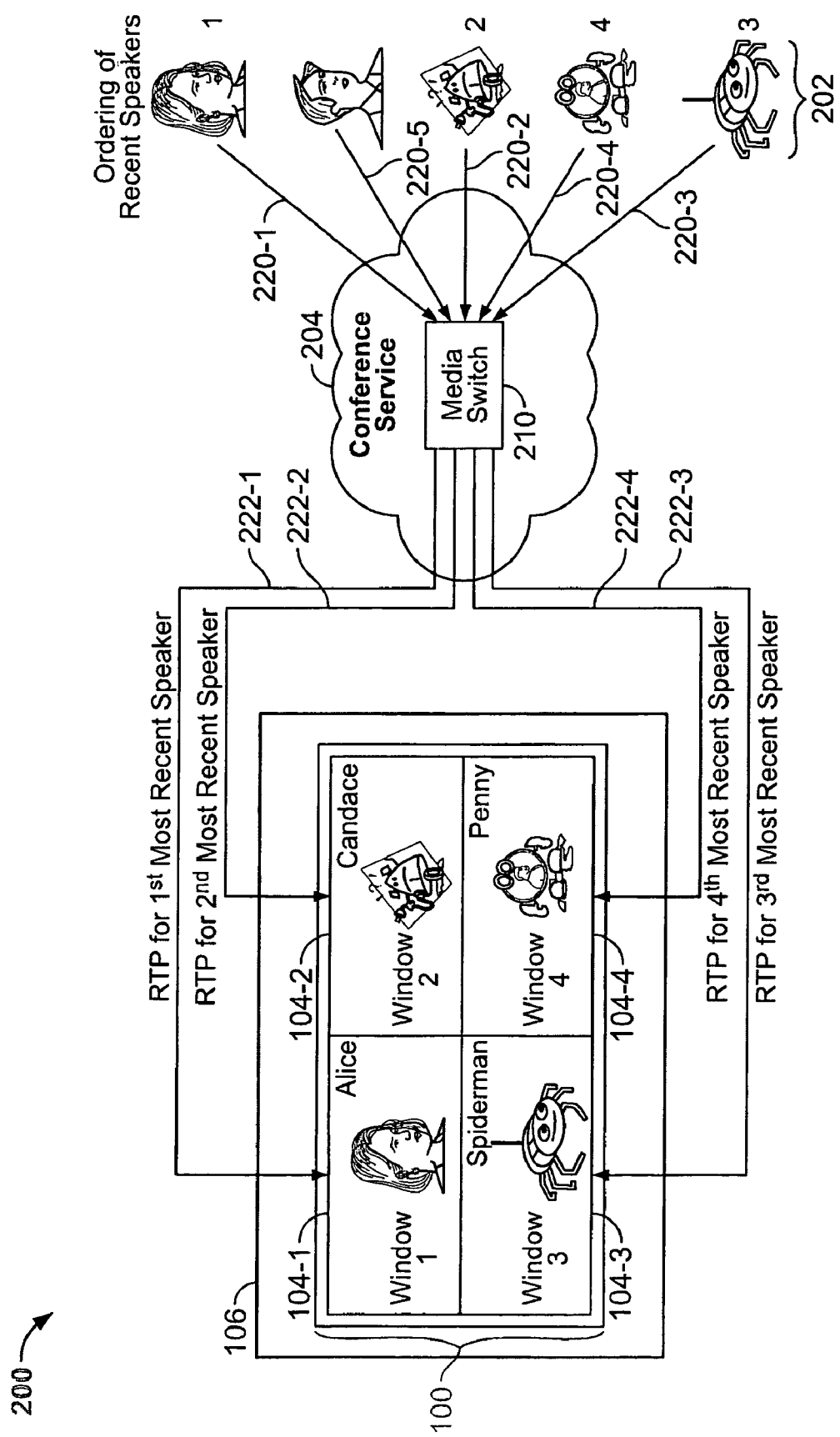
FIGS. 4A and 4B depict an example of system using a media switch according to one embodiment of the invention.
Figure 4B:
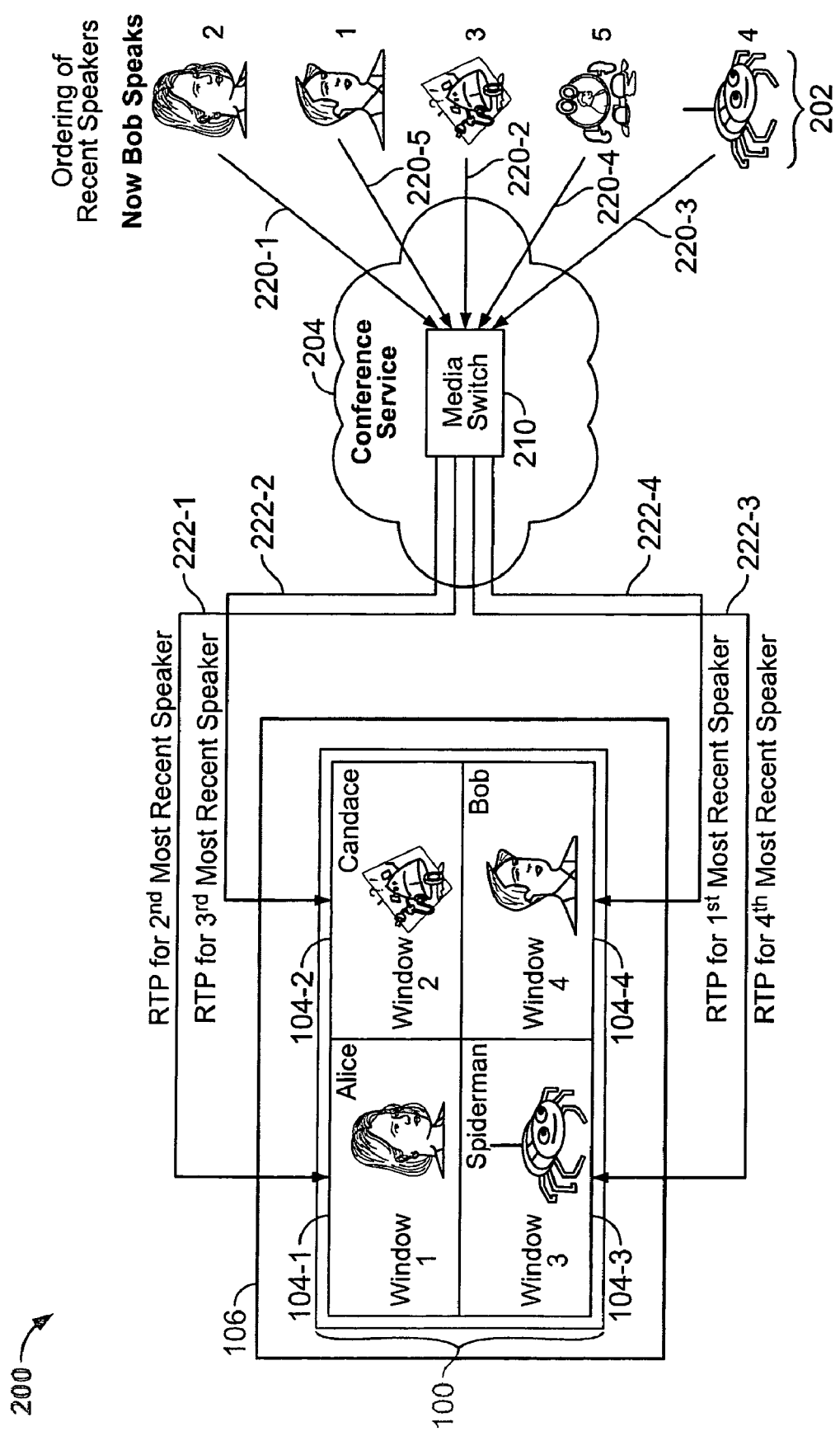

FIGS. 4A and 4B depict an example of system 200 using media switch 210 according to one embodiment of the invention. System 200 includes a plurality of source end devices 202, conference service 204, and end device 106.

Media switch 210 is located remotely from end device 106. Media switch 210 is configured to receive requests for destination video streams 222 according to a policy. In response to the request, media switch 210 maps source video streams 220 from sources 202 to destination video streams 222. Destination video streams 222 are then provided to end device 106. Although media switch 210 is described, it will be recognized that media switch 210 may be any device remote from end device 106.

Four source video streams 220 are mapped to the four destination streams 222. In one example, the policy may be to send the four most recent speakers. Thus, source video streams 220 from the five end devices 202 are received by the media switch 210, which selects source video streams 220 from the source end devices 202 associated with the four most recent speakers and forwards those source video streams 220 as destination streams 222 to end device 106. As shown, streams 220-1-220-4 represent content from the four most recent speakers. Stream 220-1 is the source video stream from Alice, stream 220-2 is the source video stream for Candace, stream 220-3 is the source video stream for Spiderman, and stream 220-4 is the source video stream for Penny.

In one embodiment, media switch 210 is configured to manage which source video streams 220 are mapped to which destination video streams 222 based on the method described in FIG. 3. Although the method in FIG. 3 is described, it will be understood that the method in FIG. 3 is used as an example and other time-based and non-time based policies may be used. Because media switch 210 manages the mapping, end device 106 does not need to know how to interpret events that occur but knows which destination video streams 222 are associated with which windows 104. For example, a destination stream 222-1 is fixedly associated with window 104-1, a destination stream 222-2 is fixedly associated with window 104-2, a destination stream 222-3 is fixedly associated with window 104-3, and a destination stream 222-4 is fixedly associated with window 104-4.

Destination streams 222 include content from the four most recent speakers and are sent to end device 106. At the point in time shown in FIG. 4A, destination stream 222-1 includes content from the first most recent speaker is output in window 104-1 (Alice), destination stream 222-2 includes content from the second most recent speaker is output in window 104-2 (Candace), destination stream 222-3 includes content from the third most recent speaker is output in window 104-3 (Spiderman), and destination stream 222-4 includes content from the fourth most recent speaker is output in window 104-4 (Penny).

When an event occurs, the desirability of source video streams 220 may change, based on the policy requested by the end device 106. Thus, the mapping for source video streams 220 to destination streams 222 may be affected. For example, at the point in time shown in FIG. 4B, Bob has spoken and become the most recent speaker. Thus, Alice is now the second most recent speaker, Candace the third, and Spiderman the fourth. Penny was the fourth most recent speaker and is not included in display 100 anymore (she is not among the four most recent speakers).

Media switch 210 is configured to determine how to map source video streams 220 to destination video streams 222 based on the method described in FIG. 3. As shown, content from Bob's source video stream 220-5, now being the most recent speaker, is mapped to destination stream 222-4 and displayed in window 104-4, which was previously occupied by Penny. Content from other source video streams 220 remain mapped to the same destination streams and are therefore rendered in the same window as before but they are now associated with different a different speaker order. For example, stream 222-1 is now associated with the second most recent speaker, stream 222-2 is now associated with the third most recent speaker, and stream 222-3 is now associated with the fourth most recent speaker.

After mapping source video streams 220 to destination video streams 222 based on the method described in FIG. 3, destination streams 222 are sent to end device 106. End device 106 does not have to be aware of events that occurred. Rather, end device 106 maintains a constant mapping of each destination stream 222 to a window 104. Content from each destination stream 222 received is then output in a window 104 associated with the destination stream 222.

The content from the four most recent speakers is sent to end device 106. The content from the first most recent speaker is output in window 104-4 (Bob), the content from the second most recent speaker is displayed in window 104-1 (Alice), the content from the third most recent speaker is displayed in window 104-2 (Candace), and the content from the fourth most recent speaker is displayed in window 104-3 (Spiderman). Thus, the number of windows 104 who's content from source video streams 220 changes, due to changes in the desirability of the source streams 220, is minimized.

In another embodiment, an event aware stream router (EASR), based on either a time-based or non-time-based policy, is used to map destination video streams 222 to the proper display windows 104 on the end device 106. The EASR may be found at end device 106 and receives destination streams 202 from a media switch. In addition to the mapping of destination streams 202 to windows 104, the EASR also maintains a mapping of the identity of each source stream 220 currently displayed to the window 104 in which it is displayed.

Figure 5:
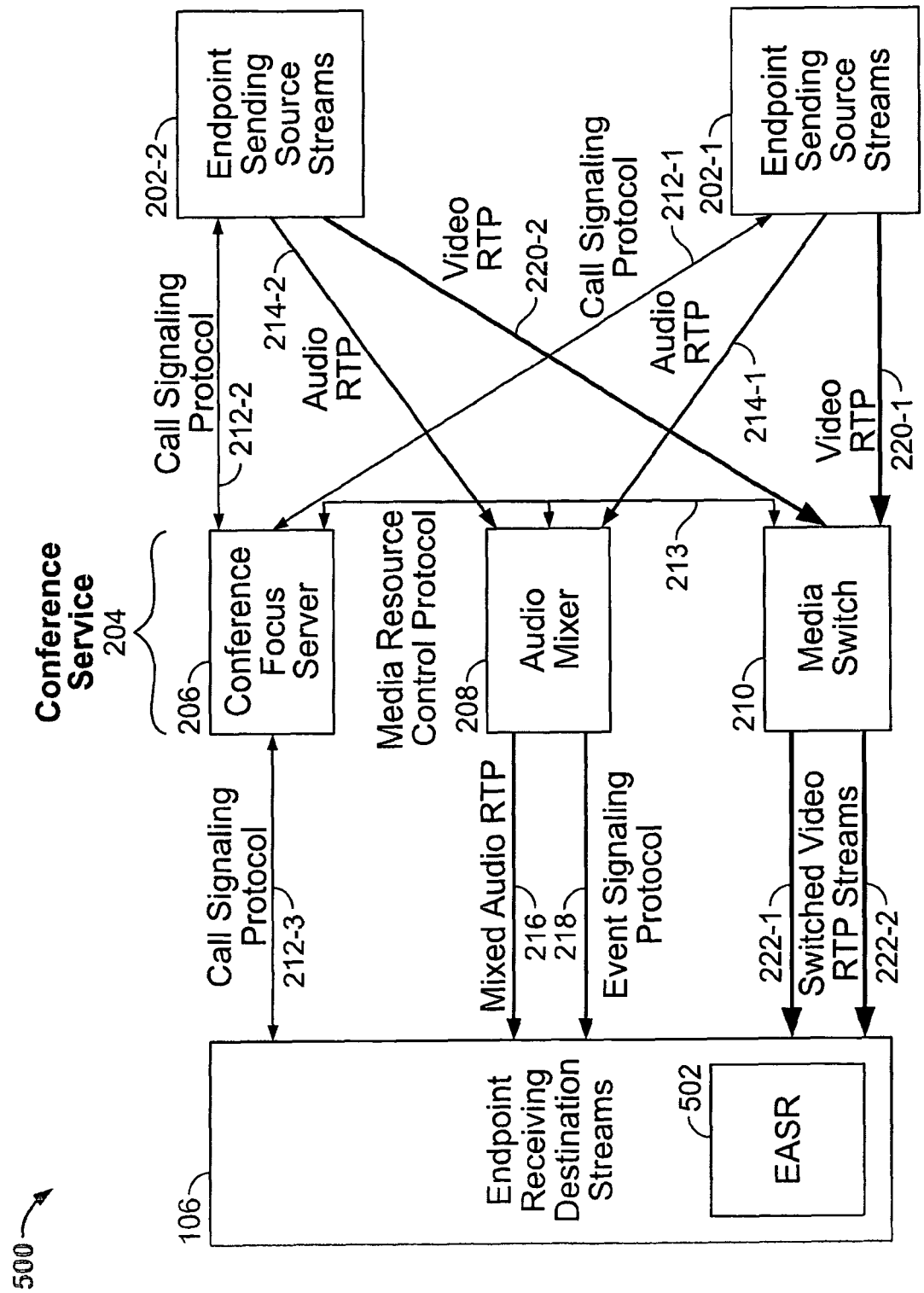
FIG. 5 depicts a system for implementing an embodiment of the present invention using an event aware stream router (EASR) according to embodiments of the present invention.

FIG. 5 depicts a system 500 for implementing an embodiment of the present invention using an event aware stream router 502 according to embodiments of the present invention. System 500 includes source end devices 202, a conference service 204, and a destination end device 106. In an example, conference service 204 includes conference focus server 206, an audio mixer 208, and a media switch 210. These components are similar to components described in FIG. 2.

The difference in FIG. 5 is that the event signaling is sent to end device 106 using event signaling protocol 218. End device 106 then determines where to output destination video streams sent from media switch 210, which will be described in FIGS. 6A and 6B. For example, EASR 502 uses the event signaling protocol 218 to determine how to map destination video streams to windows 104.

Figure 6:
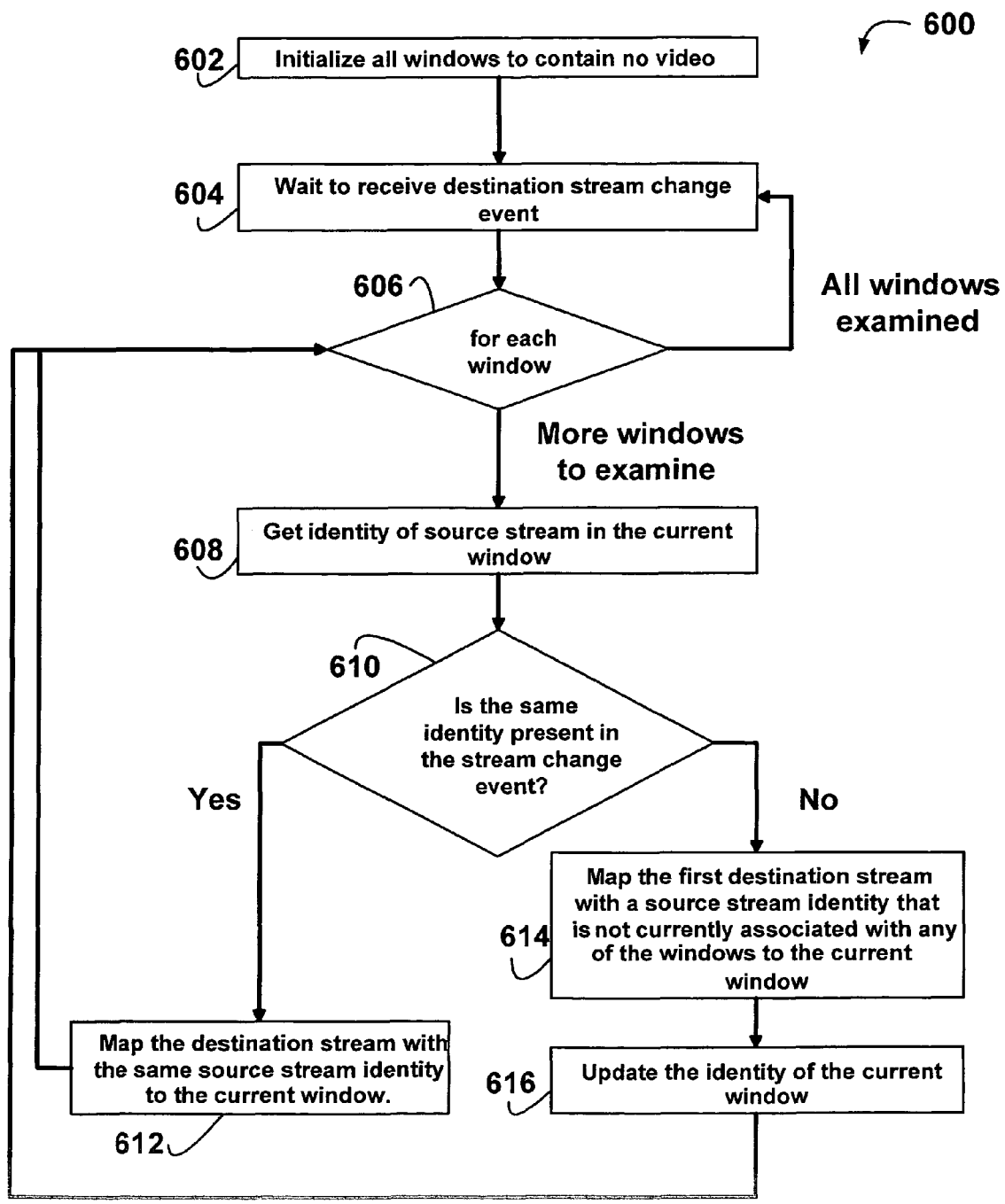
FIG. 6 depicts a simplified flowchart of a method for displaying content from source video streams using an EASR according to one embodiment of the present invention.

FIG. 6 depicts a simplified flowchart 600 of a method for displaying content from source video streams 220 using an EASR 502 according to one embodiment of the present invention. In this embodiment, destination streams 222 are mapped from source streams 220 strictly according to their desirability and EASR 502 is responsible for changing the mapping from destination streams 222 to display windows 104 so that the change in window contents from source video streams 220, due to changes in the desirability of source video streams 220, is minimized. This is different from the embodiment described in FIG. 2, where the source streams 220 are mapped to destination streams 222 so that a fixed mapping of destination streams 222 to windows 104 can be maintained by the end device 106. Furthermore, end device 106 receives events from conference service 204 containing information sufficient to determine the identity of a source stream 220 mapped to each destination stream 222 at the time the event is received. In this embodiment, these events are conveyed to the end device 106 from the conference service 204 through a policy-based event protocol 218.

In step 602, EASR 502 initializes all windows 104 to contain no video. It will be recognized that windows 104 may be initialized to include any information, such as static images, an icon, pre-recorded video, etc.

In step 604, EASR 502 waits for an event to be received from the policy-based event protocol 218. This event indicates that the mapping of source streams 220 to destination streams 222 has changed. The event contains an entry for each destination stream 222 describing the identity of the source stream 220 that is now mapped to the destination stream 222.

In step 606, EASR 502 begins to examine each window 104 it controls. When all windows 104 have been examined, the mapping of destination streams 222 to windows 104 by the EASR 502 is complete and the method returns to step 604 to await the receipt of another event.

If all windows 104 have not yet been examined, the method proceeds to step 608, where EASR 502 determines the identity of the source stream 220 currently displayed in the window 104 being examined.

In step 610, the method checks the stream change event to see if the same source stream identity is listed in the mappings of any of the current destination streams 222. If the identity is present, the method proceeds to step 612, where the destination stream 222 with the same source stream identity is mapped to the current window 104. This step ensures that the contents of the current window does not change, even if the destination stream 222 on which that content is transmitted changes because the relative desirability of the source stream 220 has changed. Following the re-mapping of destination stream 222, the method returns to step 606 to check if there are any more windows 104 to examine.

If the identity in the current window 104 is not listed in any of the mappings listed in the stream change event, the method proceeds to step 614, where the event is scanned for a destination stream 222 whose source stream identity is not listed as the identity of any of the current window mappings. Note that such an identity should be present, since the previous identity mapped in the current window 104 no longer exists, and a previously unmapped source stream 220 should have been mapped to take its place. When such a destination stream 222 is located, the method maps that destination stream 222 to the current window 104. Note that the contents of the current window 104 therefore changes. This change is acceptable, since the content is from a source stream 220 that was not being previously displayed. The method then proceeds to step 616, where the source stream identity is mapped into the current window 104, as well. The method then proceeds back to step 606 to check if there are any more windows 104 to examine.

The method will therefore continuously loop through duration of the conference, waiting to receive an event, then mapping destination streams to windows based on the event. Because the EASR never changes the content of a window whose identity shows up in any of the destination streams, this method fulfills the requirement that the number of windows whose contents from source video streams 220 change, due to changes in the desirability of source streams, is minimized.

Figure 7A:
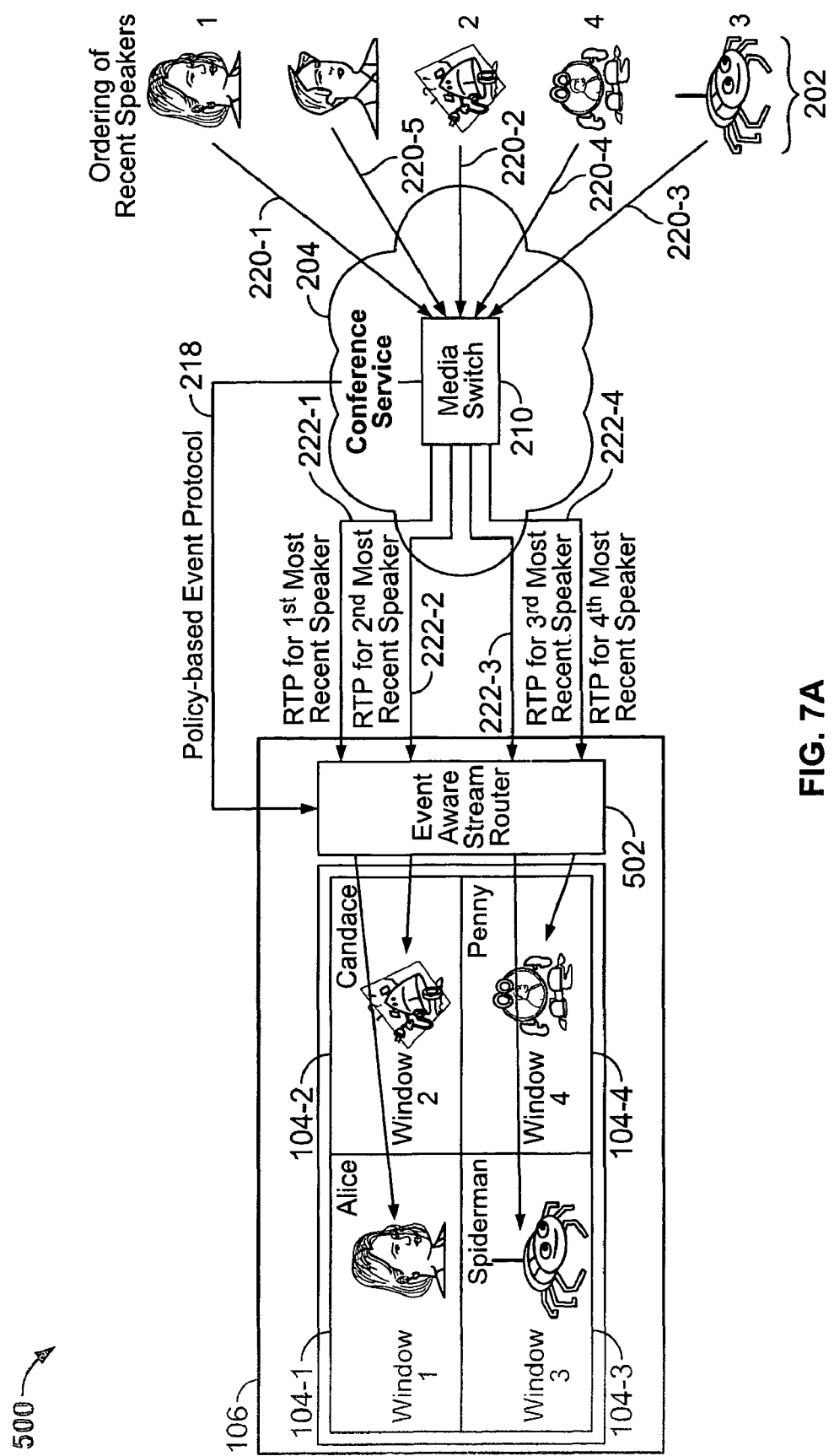
FIGS. 7A and 7B depict an example of system using an event aware stream router (EASR) according to one embodiment of the invention.
Figure 7B:
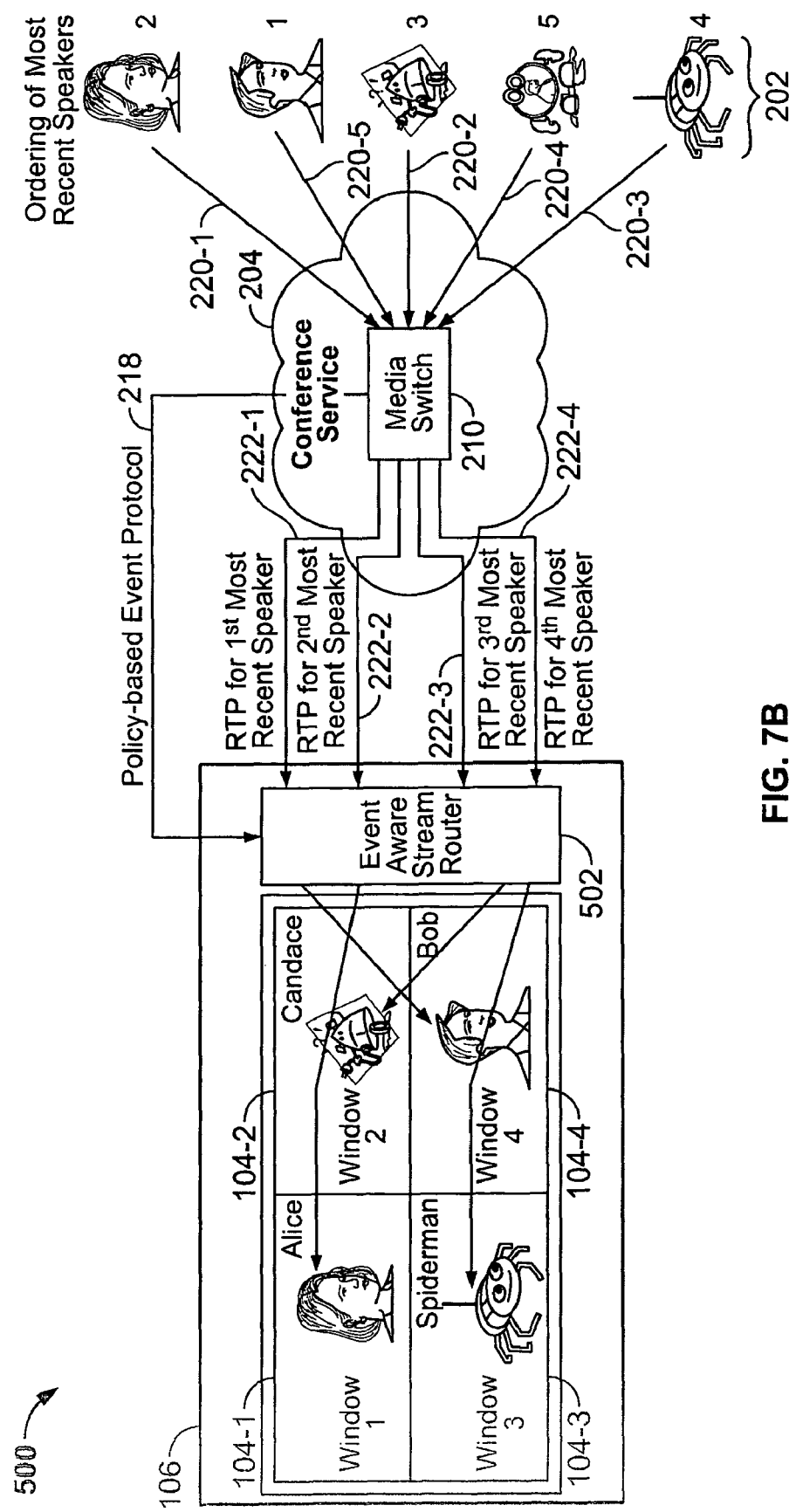

FIGS. 7A and 7B depict an example of system 500 using an event aware stream router (EASR) 402 according to one embodiment of the invention. System 500 includes a plurality of sources 202, a conference service 204, a media switch 210, end device 106, and windows 104.

In one embodiment, EASR 502 requests four destination video streams 222 based on a policy. For example, the policy may be: send the four most recent speakers. Media switch 210 sends four source video streams 220-1-220-4 to EASR 502 that are mapped to the requested four destination video streams 222-1 to 222-4. In one embodiment, destination streams 222-1 to 222-4 may represent the most recent speaker to the fourth most recent speaker.

Media switch 210 maps source video streams to destination video streams based on which source end devices 202 are the four most recent speakers. In this embodiment, media switch 210 does not further map source video streams 220 to windows 104 such that the method described in FIG. 3 is adhered to. Rather, EASR 502 is event aware and is configured to change the mapping of destination streams 222 to windows 104 based on the LRU display method.

A destination stream 222-1 may represent the most recent speaker (Alice), destination stream 222-2 may represent the second most recent speaker (Candace), destination stream 222-3 may represent the third most recent speaker (Spiderman), and destination stream 222-4 may represent the fourth most recent speaker (Penny). For the initial mapping, as shown in FIG. 7A, EASR 502 displays the most recent speaker video stream (destination stream 222-1) in window 104-1, the second most recent video stream (destination stream 222-2) in window 104-2, the third most recent video stream (destination stream 222-3) in window 104-3, and the fourth most recent video stream (destination stream 222-4) in window 104-4. The windows to display the video streams are determined based on the LRU display method.

When a conference state change event occurs, as shown in FIG. 7B, media switch 210 remaps source video streams 220 to destination video streams 222 based on the event. Source video streams 220 for the four most recent speakers are mapped to the four destination video streams 222. If the event changes the ordering of the four most recent speakers or adds a new speaker (thereby removing a speaker), media switch 210 changes the mapping of source video streams 220 to destination video streams 222 but each destination of destination streams 222 continues to represent the same speaker order. For example, Bob is now the most recent speaker and his source video stream 220-5 is mapped to destination stream 222-1, Alice is now the second most recent speaker and her source video stream 220-1 is mapped to destination stream 222-2, Candace is now the third most recent speaker and her source video stream 220-2 is mapped to destination stream 222-3, and Spiderman is now the fourth most recent speaker and his source video stream 220-3 is mapped to destination stream 222-4. Penny is no longer one of the four most recent speakers and her source video stream 220-4 is thus not mapped to a destination stream 222. Thus, the ordering of the most recent speakers remains the same for the destination streams as destination stream 222-1 is associated with the most recent speaker, destination stream 222-2 is associated with the second most recent speaker, etc. However, source video streams 220 that are associated with which destination video stream 222 change based on the ordering of the four most recent speakers.

EASR 502 receives the four destination video streams 222, and is configured to render them in the appropriate windows 104. EASR 502 receives a policy-based speaker event signal 218 and determines if any changes to the mapping of destination streams 222 to windows 104 need to be performed.

Signal 218 may indicate that a new speaker, Bob, has spoken and that the speaker order of all other source streams has therefore changed. In the above example, content from the new source video stream 220-5 from Bob needs to be displayed in window 104-4 in which content from Penny's source video stream 220-4 was previously being displayed to adhere to the requirement that the number of windows whose contents change, due to changes in the desirability of source streams, be minimized. EASR 502 determines this and switches the mappings of destination video streams 222 to windows 104 to adhere to the LRU display method. For example, destination stream 222-1 may represent the most recent speaker (Bob) and is mapped to window 104-4, destination stream 222-2 may represent the second most recent speaker (Alice) and is mapped to window 104-1, destination stream 222-3 may represent the third most recent speaker (Candace) and is mapped to window 104-2, and destination stream 222-4 may represent the fourth most recent speaker (Spiderman) and is mapped to window 104-3.

EASR 502 may manage the mapping as described above with respect to media switch 210. For example, when events occur, EASR 502 analyzes the events and determines if mappings need to be changed. EASR 502 may use a list, as described above; to determine which destination video streams 222 should be mapped to which windows 104. The ability of EASR 502 to map the destination streams 222 dynamically to the windows 104 ensures changes of content from source video streams 220 displayed in windows 104, due to changes in the desirability of source video streams 220, is minimized.

Figure 8:
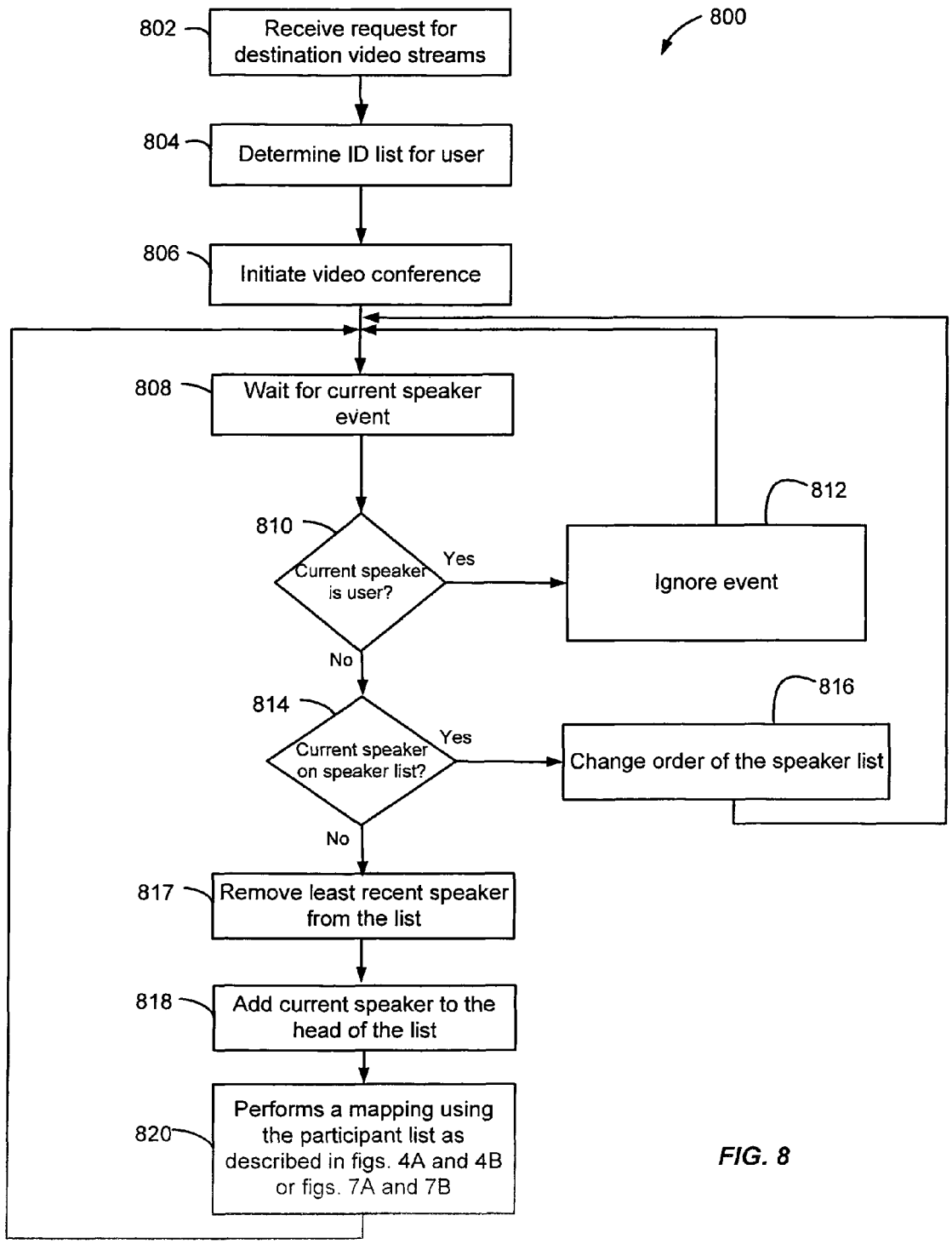
FIG. 8 depicts a simplified flow chart of a method for implementing an LRU display method according to one embodiment of the present invention.

FIG. 8 depicts a simplified flow chart 800 of a method for implementing a least-recent use (LRU) display method according to one embodiment of the present invention. The LRU method is a more efficient simplification of the more general methods described in FIGS. 3 and 6. The LRU method can be used to implement any time-based policy. In the illustrated method, the time-based policy is the "most recent speaker" policy. Also, variations to the discussed method of implementing LRU may be appreciated.

In step 802, a request for destination video streams is received from a participant. The request may be received at media switch 210 or EASR 502. The request is based on the LRU display method.

In step 804, an identifier list (ID list) of the participant's source video streams 220 is determined. The list is used so that content from the participant is not displayed on the participant's end device 106. This allows the participant to not see him/herself. It will be understood that the participant's source video stream 220 can be displayed for the participant if that is desired.

In step 806, the video conference is initiated. In the beginning, windows 104 and destination streams 222 are empty because no one has spoken yet. In other embodiments, windows 104 may include content from source video streams 220 that have been pre-selected based on settings, such as the first four participants to sign in to the conference, icons, prerecorded video, etc.

In step 808, the method waits until a current speaker event is received. In one embodiment, the current speaker event is received only on the media switch 210. In another embodiment, the current speaker event is conveyed to EASR 502 through a policy-based event protocol 218.

Once an event is received, step 810 determines if the current speaker is the participant who requested the destination video streams (i.e. is the participant using the receiving end device 106). The ID list generated in step 804 is checked to determine if the current speaker is the participant. The current speaker event may have a current speaker ID associated with it. The current speaker ID is compared to IDs in the ID list to determine if it is the participant who is the current speaker.

If the current speaker is the participant, then step 812 ignores the event and the process reiterates to step 808 to wait for more events.

If the current speaker is not the participant, step 814 determines if the current speaker is in the speaker list. The speaker list is a list of the most recent speakers from which content is being outputted in windows 104. Content from source video streams 220 being output in windows 104 do not need to be changed if the current speaker is on the speaker list. This is because a new speaker is already being displayed. However, the order of the speakers in the speaker list may change.

If the current speaker is in the speaker list, in step 816, the order of the speaker list is changed to reflect the current speaker event. For example, the current speaker is moved to the head of the speaker list. Some other speakers on the speaker list are also shifted. For example, the speakers may be shifted down until the spot where the current speaker was located is reached.

If the current speaker is not in the speaker list, step 817 also removes the least recent speaker from the tail of the list. In step 818, the current speaker is added to the head of the speaker list as the most recent speaker. The other speakers in the speaker list are shifted down.

Step 820 performs a mapping using the participant list as described in FIGS. 4A and 4B or FIGS. 7A and 7B. For example, media switch 210 may map source video streams 220 to destination video streams for sending to end device 106. Also, EASR 502 may map destination streams to windows 104. Following this step, the method returns to step 808 to wait for more events.

Although the invention has been described with respect to specific embodiments thereof, these embodiments are merely illustrative, and not restrictive of the invention. For example, content, as used herein in this document can include any type of numeric, voice, audio, video, audio-visual, script data, any type of source or object code, or any other suitable information in any appropriate format that may be communicated from one point to another.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for displaying content from a plurality of sources in a video conference display in a plurality of display windows, wherein content from each source is displayed in its own display window, the method comprising:

determining a first set of N most desirable source video streams of M available source video streams based on first ordering of desirability of the M available source video streams, the first ordering of desirability determined based on a policy, wherein M is greater than N;

mapping the first set of N most desirable source video streams to N destination video streams such that content from the N most desirable source video streams is rendered in the plurality of windows for a video conference without duplication of the N most desirable source video streams in more than one of the windows;

determining one or more state changes in the video conference that causes a change in the mapping of N source video streams to the N destination video streams;

determining, by a computing device, a second set of N most desirable source video streams from M available source video streams based on second ordering of desirability of the M available source video streams, the second ordering of desirability determined based on the policy, wherein the second set of N most desirable video streams includes at least one new source video stream that replaces at least one of the N source video streams in the first set; and mapping, by the computing device, the second set of N most desirable source video streams to the N destination video streams, wherein the destination video streams are mapped to the plurality of display windows such that content from the N most desirable source video streams is rendered in the plurality of windows, wherein when changes in desirability of the source video streams being mapped to the N destination video streams occur, a number of windows that change their contents from associated sources is minimized, wherein source video streams in the first set of N most desirable source video streams not replaced by the at least one new source video stream have different desirabilities from the first ordering.

2. The method of claim 1, wherein the policy comprises a time-based policy.

3. The method of claim 2, wherein mapping of the second set of N source streams to N destination streams comprises changing a mapping of a single source stream to a single destination stream after the one or more state changes are determined.

4. The method of claim 2, wherein mapping of the second set of N source streams to N destination streams does not change after the one or more state changes are determined 5. The method of claim 1, wherein the policy comprises a non-time-based policy.

6. The method of claim 5, wherein mapping of the second set of N source streams to N destination streams comprises changing the mapping of one or more source streams in the N source streams.

7. The method of claim 5, wherein the mapping of the source streams to destination streams does not change after the one or more state changes are determined.

8. The method of claim 1, wherein an end device including the plurality of display windows is unaware of the one or more state changes.

9. The method of claim 8, wherein each of the N destination streams are fixedly mapped to a display window.

10. The method of claim 1, wherein the N destination streams are mapped to the plurality of display windows by an event aware stream router at an end device displaying the plurality of display windows.

11. The method of claim 10, wherein the end device is aware of the one or more state changes.

12. The method of claim 11, wherein the end device maps the N destination video streams to the plurality of display windows based on the one or more state changes.

13. A method displaying content from a plurality of sources in a video conference display in a plurality of display windows, wherein content from each source is displayed in its own display window, the method comprising:
receiving a first set of N most desirable source video streams from M available source video streams based on a first ordering of desirability of the M available source video streams, the first ordering of desirability determined based on a policy, the received N source video streams being mapped to the N destination video streams, wherein M is greater than N;
mapping, at an end device, the destination video streams to the plurality of display windows such that content from the N most desirable source video streams is rendered in the plurality of windows without duplication of the N most desirable source video streams in more than one of the windows;
receiving a second set of N most desirable source video streams from M available source video streams based on second ordering of desirability of the M available source video streams, the second ordering of desirability determined based on a policy and one or more state changes, the received N most desirable source video streams being mapped to the N destination video streams, wherein the second set of N most desirable video streams includes at least one new source video stream that replaces at least one of the N source video streams of the first set; and
mapping, at an end device, the destination video streams to the plurality of display windows such that content from the N most desirable source video streams is rendered in the plurality of windows, wherein when changes in desirability of the source streams occur, a number of windows that change their contents from associated sources is minimized, wherein source video streams in the first set of N most desirable source video streams not replaced by the at least one new source video stream have different desirabilities from the first ordering.

14. The method of claim 13, wherein the policy comprises a time-based policy.

15. The method of claim 13, wherein the policy comprises a non-time-based policy.

16. The method of claim 13, wherein the end device is unaware of the one or more state changes.

17. The method of claim 16, wherein each of the N destination streams are fixedly mapped to a display window.

18. The method of claim 13, further comprising receiving one or more state changes in the conference that causes a change in a mapping of N source video streams to the N destination video streams, wherein the end device maps the destination video streams to the plurality of display windows using the one or more state changes.

19. An apparatus configured to display content from a plurality of sources in a video conference display in a plurality of display windows, wherein content from each source is displayed in its own display window, the apparatus comprising:
one or more computer processors; and
a memory containing instructions that, when executed by the one or more computer processors, cause the one or more computer processors to perform a set of steps comprising:
determining a first set of N most desirable source video streams of M available source video streams based on first ordering of desirability of the M available source video streams, the first ordering of desirability determined based on a policy, wherein M is greater than N;
mapping the first set of N most desirable source video streams to N destination video streams such that content from the N most desirable source video streams is rendered in the plurality of windows for a video conference without duplication of the N most desirable source video streams in more than one of the windows;
determining one or more state changes in the video conference that causes a change in the mapping of N source video streams to the N destination video streams;
determining, by the one or more computing processors, a second set of N most desirable source video streams from M available source video streams based on second ordering of desirability of the M available source video streams, the second ordering of desirability determined based on the policy, wherein the second set of N most desirable video streams includes at least one new source video stream that replaces at least one of the N source video streams in the first set; and
mapping, by the one or more computing processors, the second set of N most desirable source video streams to the N destination video streams, wherein the destination video streams are mapped to the plurality of display windows such that content from the N most desirable source video streams is rendered in the plurality of windows, wherein when changes in desirability of the source video streams being mapped to the N destination video streams occur, a number of windows that change their contents from associated sources is minimized, wherein source video streams in the first set of N most desirable source video streams not replaced by the at least one new source video stream have different desirabilities from the first ordering.

20. The apparatus of claim 19, wherein the policy comprises a time-based policy.

21. The apparatus of claim 20, wherein the instructions cause the one or more processors to change the mapping of a single source stream to a single destination stream after the one or more state changes are determined.

22. The apparatus of claim 20, wherein the mapping of the N source streams to N destination streams does not change after the one or more state changes are determined.

23. The apparatus of claim 19, wherein the policy comprises a non-time-based policy.

24. The apparatus of claim 23, wherein the instructions cause the one or more processors to change the mapping of one or more source streams in the N source streams.

25. The apparatus of claim 23, wherein the mapping of the source streams to destination streams does not change after the one or more state changes are determined.

26. The apparatus of claim 19, wherein the end device including the plurality of display windows is unaware of the one or more state changes.

27. The apparatus of claim 26, wherein each of the N destination streams are fixedly mapped to a display window.

28. The apparatus of claim 19, wherein the destination streams are mapped to the plurality of display windows by an event aware stream router at an end device displaying the plurality of display windows.

29. The apparatus of claim 28, wherein the end device is aware of the one or more state changes.

30. The apparatus of claim 29, wherein the end device maps the N destination video streams to the plurality of display windows based on the one or more state changes.

31. An apparatus configured to display content from a plurality of sources in a video conference display in a plurality of display windows, wherein content from each source is displayed in its own display window, the apparatus comprising:
   one or more computer processors; and
   a memory containing instructions that, when executed by the one or more computer processors, cause the one or more computer processors to perform a set of steps comprising:
      receiving a first set of N most desirable source video streams from M available source video streams based on a first ordering of desirability of the M available source video streams, the first ordering of desirability determined based on a policy, the received N source video streams being mapped to the N destination video streams, wherein M is greater than N;
      rendering the N most desirable source video streams in the plurality of windows without duplication of the N most desirable source video streams in more than one of the windows;
      receiving a second set of N most desirable source video streams from M available source video streams based on second ordering of desirability of the M available source video streams, the second ordering of desirability determined based on a policy and one or more state changes, the received N most desirable source video streams being mapped to the N destination video streams, wherein the second set of N most desirable video streams includes at least one new source video stream that replaces at least one of the N source video streams of the first set; and
      mapping, at an end device, the destination video streams to the plurality of display windows such that content from the N most desirable source video streams is rendered in the plurality of windows, wherein when changes in desirability of the source streams occur, a number of windows that change their contents from associated sources is minimized, wherein source video streams in the first set of N most desirable source video streams not replaced by the at least one new source video stream have different desirabilities from the first ordering.

32. The apparatus of claim 31, wherein the policy comprises a time-based policy.

33. The apparatus of claim 31, wherein the policy comprises a non-time-based policy.

34. The apparatus of claim 31, wherein the end device is unaware of the one or more state changes.

35. The apparatus of claim 34, wherein each of the N destination streams are fixedly mapped to a display window.

36. The apparatus of claim 35, wherein the instructions cause the one or more processors to perform a further step comprising receiving one or more state changes in the conference that causes a change in a mapping of N source video streams to the N destination video streams, wherein the end device maps the destination video streams to the plurality of display windows using the one or more state changes.

37. The method of claim 1, wherein the video conference display comprises a plurality of display devices.

38. The method of claim 1, wherein the video conference display comprises a single display device.

39. The method of claim 13, wherein the video conference display comprises a plurality of display devices.

40. The method of claim 13, wherein the video conference display comprises a single display device.

41. The apparatus of claim 19, wherein the video conference display comprises a plurality of display devices.

42. The apparatus of claim 19, wherein the video conference display comprises a single display device.

43. The apparatus of claim 31, wherein the video conference display comprises a plurality of display devices.

44. The apparatus of claim 31, wherein the video conference display comprises a single display device.

45. The method of claim 1, wherein all windows in the plurality of windows are available to display the at least one new source video stream that replaces at least one of the N source video streams.

* * * * *